(12) United States Patent
Choi et al.

(10) Patent No.: US 11,271,412 B2
(45) Date of Patent: Mar. 8, 2022

(54) BATTERY MANAGEMENT SYSTEM, BATTERY PACK AND ELECTRIC VEHICLE

(71) Applicant: LG Chem, Ltd., Seoul (KR)

(72) Inventors: Ho-Deuk Choi, Daejeon (KR); Ki-Hoon Kim, Daejeon (KR)

(73) Assignee: LG Energy Solution, Ltd.

( * ) Notice: Subject to any disclaimer, the term of this patent is extended or adjusted under 35 U.S.C. 154(b) by 22 days.

(21) Appl. No.: 16/975,742

(22) PCT Filed: Nov. 19, 2019

(86) PCT No.: PCT/KR2019/015894
§ 371 (c)(1),
(2) Date: Aug. 26, 2020

(87) PCT Pub. No.: WO2020/106042
PCT Pub. Date: May 28, 2020

(65) Prior Publication Data
US 2020/0412155 A1 Dec. 31, 2020

(30) Foreign Application Priority Data
Nov. 20, 2018 (KR) .................. 10-2018-0143780

(51) Int. Cl.
*H02J 7/00* (2006.01)
*H01M 10/44* (2006.01)
*H01M 10/48* (2006.01)

(52) U.S. Cl.
CPC ......... *H02J 7/00304* (2020.01); *H01M 10/44* (2013.01); *H01M 10/48* (2013.01);
(Continued)

(58) Field of Classification Search
CPC ............ H02J 7/00304; H02J 7/007182; H02J 7/0047; H02J 2207/20; H01M 10/44; H01M 10/48; H01M 2220/20
(Continued)

(56) References Cited

U.S. PATENT DOCUMENTS

| 2011/0234177 A1 | 9/2011 | Kohara et al. |
| 2015/0155732 A1* | 6/2015 | McCormick ............ H02P 27/06 |
| | | 318/139 |

(Continued)

FOREIGN PATENT DOCUMENTS

| DE | 2932270 B1 | 12/1980 |
| DE | 102016108975 A1 | 12/2016 |

(Continued)

OTHER PUBLICATIONS

International Search Report for Application No. PCT/KR2019/015894, dated Mar. 16, 2020, pp. 1-2.

(Continued)

*Primary Examiner* — Nathaniel R Pelton
(74) *Attorney, Agent, or Firm* — Lerner, David, Littenberg, Krumholz & Mentlik, LLP (57) ABSTRACT

A battery management system protects a main contactor from inrush currents, wherein the main contactor opens and closes a charge/discharge path connected between a first battery and an electrical load before pre-charging of a capacitor provided on the side of the electrical load is completed. The battery management system double-checks whether the pre-charging of the capacitor is completed based on a voltage across the capacitor and a voltage across the main contactor. The battery management system keeps a contact of the main contactor in an open operational position when the voltage across the capacitor is less than a first (Continued)

threshold voltage or the voltage across the main contactor is equal to or higher than a second threshold voltage.

14 Claims, 3 Drawing Sheets

(52) U.S. Cl.
CPC ...... *H02J 7/0047* (2013.01); *H02J 7/007182* (2020.01); *H01M 2220/20* (2013.01); *H02J 2207/20* (2020.01)

(58) Field of Classification Search
USPC .......................................................... 320/134
See application file for complete search history.

(56) References Cited

U.S. PATENT DOCUMENTS

2016/0352106 A1* 12/2016 Schimel ................ H02J 7/0031
2017/0025872 A1* 1/2017 Kang ..................... H02J 7/0091

FOREIGN PATENT DOCUMENTS

| | | |
|---|---|---|
| EP | 2822132 A1 | 1/2015 |
| JP | 2004120866 A | 4/2004 |
| JP | 2007242247 A | 9/2007 |
| JP | 2008178164 A | 7/2008 |
| JP | 2009159804 A | 7/2009 |
| JP | 2011211761 A | 10/2011 |
| JP | 4982205 B2 | 7/2012 |
| JP | 5835009 B2 | 12/2015 |
| KR | 20070045404 A | 5/2007 |
| KR | 20090039891 A | 4/2009 |
| KR | 20130083528 A | 7/2013 |
| KR | 20140066360 A | 6/2014 |
| KR | 20140070148 A | 6/2014 |
| KR | 20150107309 A | 9/2015 |
| KR | 20170000404 U | 2/2017 |
| KR | 20170099287 A | 8/2017 |
| KR | 20180071114 A | 6/2018 |

OTHER PUBLICATIONS

Extended European Search Report for Application No. 19888163.3, dated Sep. 7, 2021, 5 pages.

\* cited by examiner

BATTERY MANAGEMENT SYSTEM, BATTERY PACK AND ELECTRIC VEHICLE

CROSS-REFERENCE TO RELATED APPLICATIONS

The present application is a national phase entry under 35 U.S.C. § 371 of International Application No. PCT/KR2019/015894 filed Nov. 19, 2019, published in Korean, which claims priority from Korean Patent Application No. 10-2018-0143780 filed Nov. 20, 2018, all of which are incorporated herein by reference.

TECHNICAL FIELD

The present disclosure relates to technology for protecting a main contactor for opening and closing a charge/discharge path between a battery and an electrical load from inrush currents.

BACKGROUND ART

Recently, there is dramatically growing demand for portable electronic products such as laptop computers, video cameras and mobile phones, and with the extensive development of electric vehicles, accumulators for energy storage, robots and satellites, many studies are being made on high performance batteries that can be recharged repeatedly.

Currently, commercially available batteries include nickel-cadmium batteries, nickel-hydrogen batteries, nickel-zinc batteries, lithium batteries and the like, and among them, lithium batteries have little or no memory effect, and thus they are gaining more attention than nickel-based batteries for their advantages that recharging can be done whenever it is convenient, the self-discharge rate is very low and the energy density is high.

An electrically powered system generally includes a main contactor installed between a battery and an electrical load. For power transmission between the battery and the electrical load, a battery management system controls the ON/OFF of the main contactor. In case that there is a large voltage difference between the battery and the electrical load, when the main contactor is closed, the main contactor may be damaged by a flow of instantaneous high current. To prevent this problem, it is necessary to perform a pre-charging process to charge a capacitor provided on the side of the electrical load before closing the main contactor.

However, it may be erroneously determined that the pre-charging of the capacitor was completed although not yet actually completed, and in this case, inrush currents flow through the main contactor, causing damage to the main contactor.

SUMMARY

Technical Problem

The present disclosure is designed to solve the above-described problem, and therefore the present disclosure is directed to providing a battery management system for preventing damage to a main contactor due to inrush currents by double-checking whether pre-charging of a capacitor provided on the side of the electrical load is completed, a battery pack including the battery management system and an electric vehicle including the battery pack.

These and other objects and advantages of the present disclosure may be understood by the following description and will be apparent from the embodiments of the present disclosure. In addition, it will be readily understood that the objects and advantages of the present disclosure may be realized by the means set forth in the appended claims and a combination thereof.

Technical Solution

A battery management system according to an aspect of the present disclosure includes a first voltage sensor configured to detect a first voltage between a first terminal and a second terminal of a first battery, a second voltage sensor configured to detect a second voltage between a first terminal and a second terminal of a capacitor provided on a side of an electrical load, a high-side driver connected to a first end of a contactor coil included in a main contactor installed between the first terminal of the first battery and the first terminal of the capacitor, a low-side driver connected to a second end of the contactor coil, a malfunction prevention circuit including a safety switch installed between the first end of the contactor coil and the high-side driver or between the second end of the contactor coil and the low-side driver, and a control circuit operably coupled to the high-side driver, the low-side driver, the first voltage sensor, the second voltage sensor and the malfunction prevention circuit. The control circuit is configured to determine a first threshold voltage based on the first voltage. The control circuit is configured to output a first high-level signal when the second voltage is equal to or higher than the first threshold voltage. The malfunction prevention circuit is configured to output a second high-level signal to the safety switch in response to the first high-level signal when a third voltage between a first end and a second end of the main contactor is lower than a second threshold voltage. The safety switch is turned on by the second high-level signal.

The control circuit may be configured to determine the first threshold voltage by multiplying the first voltage by a first scaling value. The first scaling value may be greater than 0 and smaller than 1.

The control circuit may be configured to determine the first threshold voltage by subtracting a predetermined reference voltage from the first voltage.

The control circuit may be configured to output a first low-level signal when the second voltage is lower than the first threshold voltage. The malfunction prevention circuit may be configured to output a second low-level signal to the safety switch in response to the first low-level signal. The safety switch is turned off by the second low-level signal.

The malfunction prevention circuit may further include a voltage comparator having a first input pin connected to a first common node between the first terminal of the first battery and the first end of the main contactor, a second input pin connected to a second common node between the first terminal of the capacitor and the second end of the main contactor, and a first output pin, and a verification circuit having a third input pin connected to the first output pin, a fourth input pin connected to the control circuit and a second output pin connected to the safety switch. The voltage comparator may be configured to output a third high-level signal from the first output pin when the third voltage applied between the first input pin and the second input pin is lower than the second threshold voltage. The verification circuit may be configured to output the second high-level signal from the second output pin when the third high-level signal and the first high-level signal are input to the third input pin and the fourth input pin respectively.

The voltage comparator may be configured to output a third low-level signal from the first output pin when the third voltage is equal to or higher than the second threshold voltage. The verification circuit may be configured to output the second low-level signal from the second output pin when the third low-level signal is input to the third input pin or the first low-level signal is input to the fourth input pin.

A battery management system according to another aspect of the present disclosure includes a first voltage sensor configured to detect a first voltage between a first terminal and a second terminal of a first battery, a second voltage sensor configured to detect a second voltage between a first terminal and a second terminal of a capacitor provided on a side of an electrical load, a high-side driver connected to a first end of a contactor coil included in a main contactor installed between the first terminal of the first battery and the first terminal of the capacitor, a low-side driver connected to a second end of the contactor coil, a malfunction prevention circuit including a safety switch installed between the first end of the contactor coil and the high-side driver or between the second end of the contactor coil and the low-side driver, and a control circuit operably coupled to the high-side driver, the low-side driver, the first voltage sensor, the second voltage sensor and the malfunction prevention circuit. The control circuit is configured to determine a first threshold voltage based on the first voltage. The control circuit is configured to output a first high-level signal when the second voltage is equal to or higher than the first threshold voltage. The malfunction prevention circuit is configured to output a second high-level signal to the safety switch in response to the first high-level signal when a third voltage between a first end and a second of a resistor of a pre-charge circuit connected in parallel to the main contactor is lower than a second threshold voltage. The safety switch is turned on by the second high-level signal.

The malfunction prevention circuit may further include a voltage comparator having a first input pin connected to the first end of the resistor, a second input pin connected to the second end of the resistor, and a first output pin, and a verification circuit having a third input pin connected to the first output pin, a fourth input pin connected to the control circuit and a second output pin connected to the safety switch. The voltage comparator may be configured to output a third high-level signal from the first output pin when the third voltage applied between the first input pin and the second input pin is lower than the second threshold voltage. The verification circuit may be configured to output the second high-level signal from the second output pin when the third high-level signal and the first high-level signal are input to the third input pin and the fourth input pin respectively.

A battery pack according to still another aspect of the present disclosure includes a battery management system according to any of the embodiments described herein.

An electric vehicle according to yet another aspect of the present disclosure includes a battery pack according to any of the embodiments described herein.

The electric vehicle may further include a second battery, and a converter configured to boost a voltage of the second battery and apply the boosted voltage between the first terminal and the second terminal of the capacitor in response to a fourth high-level signal from the control circuit. The control circuit may be configured to output the fourth high-level signal to the converter when the second voltage is lower than the first threshold voltage.

Advantageous Effects

According to the embodiments of the present disclosure, it is possible to double-check whether pre-charging of a capacitor provided on the side of the electrical load is completed. Accordingly, it is possible to reduce the likelihood that the main contactor will be damaged by inrush currents.

The effects of the present disclosure are not limited to the effects mentioned above, and these and other effects will be clearly understood by those skilled in the art from the appended claims.

BRIEF DESCRIPTION OF THE DRAWINGS

The accompanying drawings illustrate a preferred embodiment of the present disclosure, and together with the detailed description of the present disclosure described below, serve to provide a further understanding of the technical aspects of the present disclosure, and thus the present disclosure should not be construed as being limited to the drawings.

DETAILED DESCRIPTION

Hereinafter, the preferred embodiments of the present disclosure will be described in detail with reference to the accompanying drawings. Prior to the description, it should be understood that the terms or words used in the specification and the appended claims should not be construed as being limited to general and dictionary meanings, but interpreted based on the meanings and concepts corresponding to the technical aspects of the present disclosure on the basis of the principle that the inventor is allowed to define the terms appropriately for the best explanation.

Therefore, the embodiments described herein and illustrations shown in the drawings are just a most preferred embodiment of the present disclosure, but not intended to fully describe the technical aspects of the present disclosure, so it should be understood that a variety of other equivalents and modifications could be made thereto at the time that the application was filed.

Additionally, in describing the present disclosure, when it is deemed that a certain detailed description of relevant known elements or functions renders the key subject matter of the present disclosure ambiguous, the detailed description is omitted herein.

The terms including the ordinal number such as "first" and the like, are used to distinguish one element from another among various elements, but not intended to limit the elements by the terms.

Unless the context clearly indicates otherwise, it will be understood that the term "comprises" when used in this specification, specifies the presence of stated elements, but does not preclude the presence or addition of one or more other elements. Additionally, the term <control unit> as used herein refers to a processing unit of at least one function or operation, and this may be implemented by either hardware or software or a combination of hardware and software.

In addition, throughout the specification, it will be further understood that when an element is referred to as being "connected to" another element, it can be directly connected to the other element or intervening elements may be present.

Figure 1:
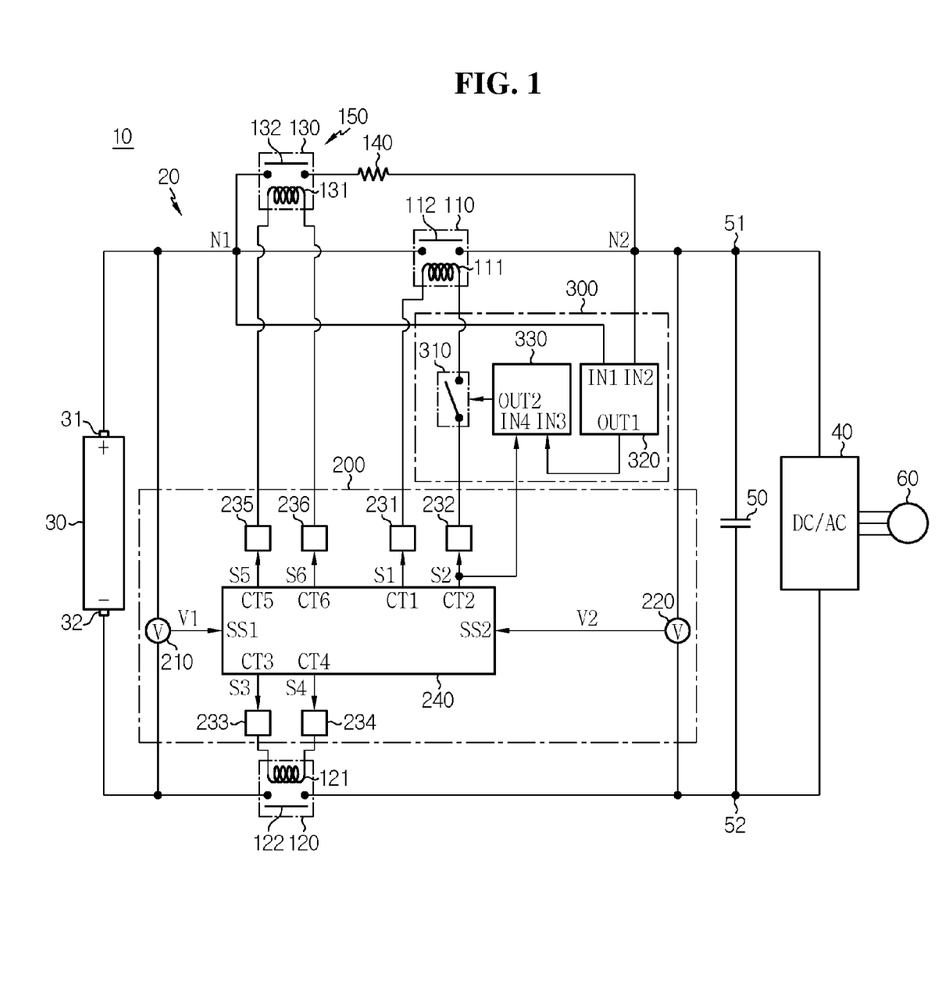
FIG. 1 is an exemplary diagram showing the configuration of an electric vehicle according to a first embodiment of the present disclosure.

FIG. 1 is an exemplary diagram showing the configuration of an electric vehicle 10 according to a first embodiment of the present disclosure.

Referring to FIG. 1, the electric vehicle 10 includes a battery pack 20, an inverter 40, a capacitor 50 and an electrical load 60.

The inverter 40 is configured to convert alternating current (DC) power from the battery pack 20 to AC power and supply the AC power to the electrical load 60, or convert AC power from a charger to direct current (DC) power and supply the DC power to the battery pack 20. The inverter 40 includes the capacitor 50 to smooth voltage changes between two terminals of the inverter 40.

The battery pack 20 include a battery 30, a main contactor 110, a main contactor 120, a pre-charge circuit 150 and a battery management system 200.

The battery 30 includes at least one unit cell. The unit cell is not limited to a particular type, and may include any rechargeable one, such as, for example, a lithium ion cell. When the battery 30 includes a plurality of unit cells, each unit cell may be electrically connected in series or in parallel to other unit cell. Although FIG. 1 shows that a terminal 31 of the battery 30 is a positive terminal and a terminal 32 of the battery 30 is a negative terminal, conversely, the terminal 31 of the battery 30 may be a negative terminal and the terminal 32 of the battery 30 may be a positive terminal.

The main contactor 110 is installed between the terminal 31 of the battery 30 and a terminal 51 of the capacitor 50. The main contactor 110 includes a contactor coil 111 and a contact 112. When the contactor coil 111 is powered, the contact 112 moves to a closed operational position by a magnetic force produced by the contactor coil 111. When the power supply to the contactor coil 111 is shut off, the contact 112 moves to an open operational position. When contactor coil 111 is powered, the contactor coil 111 is switched to a conducting state.

The main contactor 120 is installed between the terminal 32 of the battery 30 and a terminal 52 of the capacitor 50. The main contactor 120 includes a contactor coil 121 and a contact 122. When the contactor coil 121 is powered, the contact 122 moves to the closed operational position by a magnetic force produced by the contactor coil 121. When the power supply to the contactor coil 121 is shut off, the contact 122 moves to the open operational position. When contactor coil 121 is powered, the contactor coil 121 is switched to the conducting state.

The pre-charge circuit 150 is connected in parallel to the main contactor 110. The pre-charge circuit 150 includes a pre-charge contactor 130 and a resistor 140 connected in series. The pre-charge contactor 130 includes a contactor coil 131 and a contact 132. When the contactor coil 131 is powered, the contact 132 moves to the closed operational position by a magnetic force produced by the contactor coil 131. When the power supply to the contactor coil 131 is shut off, the contact 132 moves to the open operational position. When contactor coil 131 is powered, the contactor coil 131 is switched to the conducting state.

The battery management system 200 includes a voltage sensor 210, a voltage sensor 220, a high-side driver 231, a low-side driver 232, a high-side driver 233, a low-side driver 234, a high-side driver 235, a low-side driver 236, a control circuit 240 and a malfunction prevention circuit 300.

The voltage sensor 210 is configured to detect a voltage across the battery 30 (hereinafter referred to as 'battery voltage'), and generate a voltage signal V1 indicating the battery voltage. The voltage sensor 210 may be connected in parallel to the battery 30.

The voltage sensor 220 is configured to detect a voltage across the capacitor 50 (hereinafter referred to as 'capacitor voltage'), and generate a voltage signal V2 indicating the capacitor voltage. The voltage sensor 220 may be connected in parallel to the capacitor 50.

The high-side driver 231 is connected between a first end of the contactor coil 111 and a control pin CT1 of the control circuit 240. The high-side driver 231 is configured to supply a predetermined driving voltage (e.g., 12V) to the first end of the contactor coil 111 in response to a control signal S1 from the control pin CT1.

The low-side driver 232 is connected between a second end of the contactor coil 111 and a control pin CT2 of the control circuit 240. The low-side driver 232 is configured to supply a ground voltage (e.g., 0V) to the second end of the contactor coil 111 in response to a control signal S2 from the control pin CT2.

The high-side driver 233 is connected between a first end of the contactor coil 121 and a control pin CT3 of the control circuit 240. The high-side driver 233 is configured to supply a predetermined driving voltage to the first end of the contactor coil 121 in response to a control signal S3 from the control pin CT3.

The low-side driver 234 is connected between a second end of the contactor coil 121 and a control pin CT4 of the control circuit 240. The low-side driver 234 is configured to supply the ground voltage to the second end of the contactor coil 121 in response to a control signal S4 from the control pin CT4.

The high-side driver 235 is connected between a first end of the contactor coil 131 and a control pin CT5 of the control circuit 240. The high-side driver 235 is configured to supply a predetermined driving voltage to the first end of the contactor coil 131 in response to a control signal S5 from the control pin CT5.

The low-side driver 236 is connected between a second end of the contactor coil 131 and a control pin CT6 of the control circuit 240. The low-side driver 236 is configured to supply the ground voltage to the second end of the contactor coil 131 in response to a control signal S6 from the control pin CT6.

The control circuit 240 may be implemented, in hardware, to include at least one of application specific integrated circuits (ASICs), digital signal processors (DSPs), digital signal processing devices (DSPDs), programmable logic devices (PLDs), field programmable gate arrays (FPGAs), microprocessors and electrical units for performing other functions. Additionally, the control circuit 240 may have a memory device embedded therein, and the memory device may include, for example, RAM, ROM, register, hard disk, optical recording media or magnetic recording media. The memory device may store, update and/or erase programs including various types of control logics that are executed by the control circuit 240, and/or data created when the control logics are executed.

The control circuit 240 is operably coupled to the voltage sensor 210, the voltage sensor 220, the high-side driver 231, the low-side driver 232, the high-side driver 233, the low-side driver 234, the high-side driver 235, the low-side driver 236 and the malfunction prevention circuit 300.

The control circuit 240 has the control pin CT1, the control pin CT2, the control pin CT3, the control pin CT4, the control pin CT5, the control pin CT6, a sensing pin SS1 and a sensing pin SS2.

The sensing pin SS1 is connected to the voltage sensor 210 to receive the voltage signal V1. The sensing pin SS2 is connected to the voltage sensor 220 to receive the voltage signal V2.

The control circuit 240 is configured to selectively output the control signal S1 to the control pin CT1. The control circuit 240 is configured to selectively output the control signal S2 to the control pin CT2. The control circuit 240 is configured to selectively output the control signal S3 to the control pin CT3. The control circuit 240 is configured to selectively output the control signal S4 to the control pin CT4. The control circuit 240 is configured to selectively output the control signal S5 to the control pin CT5. The control circuit 240 is configured to selectively output the control signal S6 to the control pin CT6. Each control signal S1~S6 may be a voltage signal of high-level (e.g., 5V or above).

While the control circuit 240 outputs the control signal S1 and the control signal S2, the contact 112 moves to the closed operational position, and accordingly, the terminal 31 of the battery 30 and the terminal 51 of the capacitor 50 are electrically connected through the contact 112. While the control circuit 240 stops outputting at least one of the control signal S1 and the control signal S2, the contact 112 moves to the open operational position.

While the control circuit 240 outputs the control signal S3 and the control signal S4, the contact 122 moves to the closed operational position, and accordingly, the terminal 32 of the battery 30 and the terminal 52 of the capacitor 50 are electrically connected through the contact 122. While the control circuit 240 stops outputting at least one of the control signal S3 and the control signal S4, the contact 122 moves to the open operational position, and accordingly, the terminal 32 of the battery 30 and the terminal 52 of the capacitor 50 are electrically separated from each other.

While the control circuit 240 outputs the control signal S5 and the control signal S6, the contact 132 moves to the closed operational position, and accordingly, the terminal 31 of the battery 30 and the terminal 51 of the capacitor 50 are electrically connected through the contact 132 and the resistor 140. While the control circuit 240 stops outputting at least one of the control signal S5 and the control signal S6, the contact 132 moves to the open operational position.

While at least one of the contact 112 and the contact 132 is in the closed operational position, the terminal 31 of the battery 30 and the terminal 51 of the capacitor 50 are electrically connected to each other. While both the contact 112 and the contact 132 are in the open operational position, the terminal 31 of the battery 30 and the terminal 51 of the capacitor 50 are electrically separated from each other.

The stop of the output of the control signal S1 by the control circuit 240 may represent the output of a low-level (e.g., 0V) signal, rather than a high-level (e.g., 5V) signal, from the control pin CT1. The stop of the output of the control signal S2 by the control circuit 240 may represent the output of a low-level signal, rather than a high-level signal, from the control pin CT2. The stop of the output of the control signal S3 by the control circuit 240 may represent the output of a low-level signal, rather than a high-level signal, from the control pin CT3. The stop of the output of the control signal S4 by the control circuit 240 may represent the output of a low-level signal, rather than a high-level signal, from the control pin CT4. The stop of the output of the control signal S5 by the control circuit 240 may represent the output of a low-level signal, rather than a high-level signal, from the control pin CT5. The stop of the output of the control signal S6 by the control circuit 240 may represent the output of a low-level signal, a high-level signal, from the control pin CT6.

The control circuit 240 may control the main contactor 110, the main contactor 120 and the pre-charge contactor 130 in the following sequence.

First, the control circuit 240 outputs the control signal S3 and the control signal S4 to move the contact 122 to the closed operational position. Subsequently, when the capacitor voltage is lower than a first threshold voltage, the control circuit 240 outputs the control signal S5 and the control signal S6 to move the contact 132 to the closed operational position. Subsequently, the control circuit 240 determines whether the pre-charging of the capacitor 50 is completed based on the capacitor voltage. When the capacitor voltage is equal to or higher than the first threshold voltage, the control circuit 240 determines that the pre-charging of the capacitor 50 is completed. When the capacitor voltage is lower than the first threshold voltage, the control circuit 240 is configured to determine that the pre-charging of the capacitor 50 is not yet completed, and postpone outputting at least one of the control signal S1 and the control signal S2. On the contrary, when it is determined that the pre-charging of the capacitor 50 is completed, the control circuit 240 outputs the control signal S1 and the control signal S2 to move the contact 112 to the closed operational position. Subsequently, the control circuit 240 stops outputting at least one of the control signal S5 and the control signal S6 to move the contact 132 to the open operational position.

The first threshold voltage may be preset in consideration of the voltage range of the battery 30, and may be, for example, 95V. Alternatively, the control circuit 240 may determine the first threshold voltage equal to a value obtained by multiplying the battery voltage by a first scaling value. The first scaling value may be greater than 0 and smaller than 1. For example, when the battery voltage is 100V and the first scaling value is 0.95, the control circuit 240 determines 95V as the first threshold voltage. Alternatively, the control circuit 240 may determine the first threshold voltage by subtracting a predetermined reference voltage (e.g., 5V) from the battery voltage.

The malfunction prevention circuit 300 is provided to prevent the contact 112 from moving to the closed operational position due to a malfunction in the control circuit 240, an error in the voltage signal V1 or an error in the voltage signal V2 even before the pre-charging of the capacitor 50 is actually completed.

The malfunction prevention circuit 300 includes a safety switch 310, a voltage comparator 320 and a verification circuit 330.

The safety switch 310 is installed between the first end of the contactor coil 111 and the high-side driver 231 or between the second end of the contactor coil 111 and the low-side driver 232. To help the understanding, FIG. 1 shows that the safety switch 310 is connected between the second end of the contactor coil 111 and the low-side driver 232.

While the safety switch 310 is turned off, even though the control signal S1 and the control signal S2 are outputted by the control circuit 240, the contactor coil 111 is kept in a non-conducting state, and thus the contact 112 is kept in the open operational position.

The safety switch 310 may include, for example, a semiconductor switch such as a Metal Oxide Semiconductor Field Effect Transistor (MOSFET). A control terminal (e.g., a gate of the MOSFET) of the safety switch 310 may be connected to an output pin OUT2 of the verification circuit 330. The safety switch 310 is turned on in response to the signal from the output pin OUT2 being high-level. The safety switch 310 is turned off in response to the signal from the output pin OUT2 being low-level.

The voltage comparator 320 has an input pin IN1, an input pin IN2 and an output pin OUT1. The input pin IN1 is connected to a node N1. The node N1 is a specific region or area in the charge/discharge path connecting the terminal 31 of the battery 30 and a first end of the main contactor 110. The input pin IN2 is connected to a node N2. The node N2 is a specific region or area in the charge/discharge path connecting the terminal 51 of the capacitor 50 and a second end of the main contactor 110. The output pin OUT1 is connected to an input pin IN3 of the verification circuit 330.

The voltage comparator 320 compares a voltage between the input pin IN1 and the input pin IN2 (hereinafter referred to as 'first test voltage') with a second threshold voltage. The first test voltage indicates a voltage difference between the battery voltage and the capacitor voltage.

The second threshold voltage may be preset to, for example, 3V, below the first threshold voltage. Alternatively, the control circuit 240 may determine the second threshold voltage by multiplying the battery voltage by a second scaling value. The second scaling value may be smaller than the first scaling value. For example, when the battery voltage is 100V and the second scaling value is 0.05, the control circuit 240 determines 5V as the second threshold voltage. The control circuit 240 may determine the second scaling value by subtracting the first scaling value from 1.

The voltage comparator 320 is configured to output a high-level signal from the output pin OUT1 when the first test voltage is lower than the second threshold voltage. That is, independently of the control signal S1 and the control signal S2, the high-level signal indicating that the pre-charging of the capacitor 50 is completed may be outputted from the output pin OUT1. On the contrary, when the first test voltage is equal to or higher than the second threshold voltage, the voltage comparator 320 is configured to output a low-level signal from the output pin OUT1. The low-level signal outputted from the output pin OUT1 indicates that the pre-charging of the capacitor 50 is not yet completed.

The verification circuit 330 has the input pin IN3, an input pin IN4 and the output pin OUT2. The input pin IN3 is connected to the output pin OUT1 of the voltage comparator 320. The input pin IN4 may be connected to at least one of the control pin CT1 and the control pin CT2. Accordingly, when at least one of the high-side driver 231 and the low-side driver 232 receives a high-level signal from the control circuit 240, the input pin IN4 also receives the high-level signal. Alternatively, the input pin IN4 may be connected to a separate control pin (not shown) provided in the control circuit 240 to receive a high-level signal from the corresponding control pin. To help the understanding, FIG. 1 shows that the input pin IN4 is connected to the control pin CT2.

The verification circuit 330 may be implemented in hardware to include an AND-gate. When at least one of the signal received by the input pin IN3 and the signal received by the input pin IN4 is low-level, the verification circuit may be configured to output a low-level signal from the output pin OUT2. When both the signal received by the input pin IN3 and the signal received by the input pin IN4 are high-level, the verification circuit 330 may be configured to output a high-level signal from the output pin OUT2. That is, the malfunction prevention circuit 300 double-checks whether the pre-charging is completed based on the first test voltage together with the capacitor voltage. Accordingly, only when both the capacitor voltage and the first test voltage indicate that the pre-charging is completed, the verification circuit 330 outputs the high-level signal from the output pin OUT2 for turning on the safety switch 310, and thus the contactor coil 111 becomes the conducting state.

Figure 2:
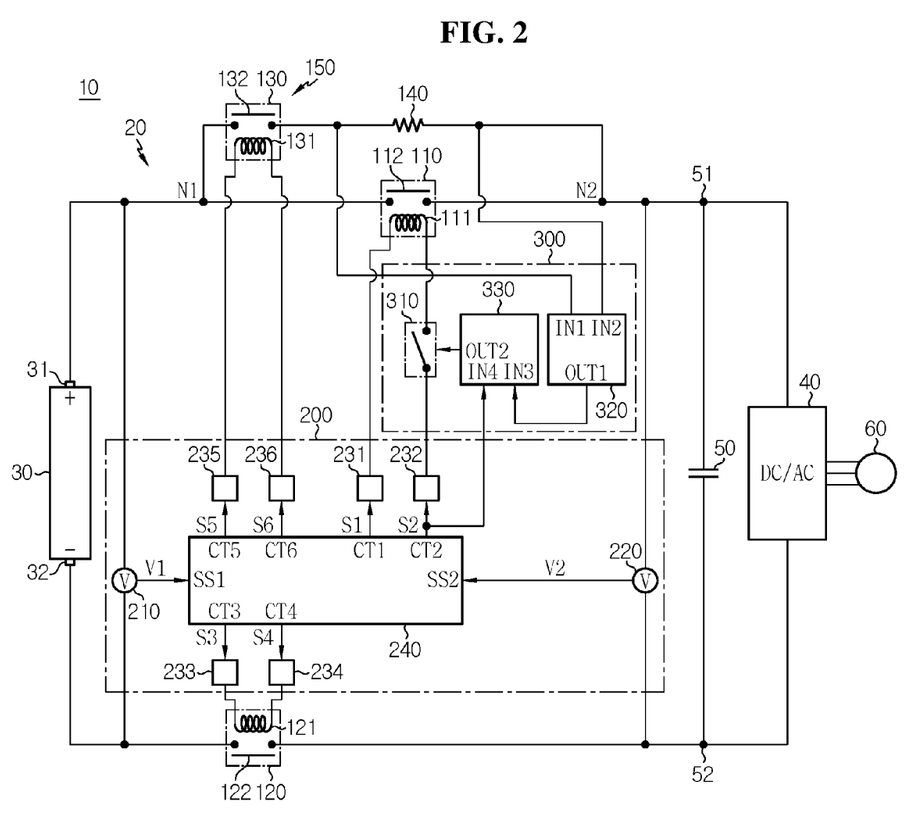
FIG. 2 is an exemplary diagram showing the configuration of an electric vehicle according to a second embodiment of the present disclosure.

FIG. 2 is an exemplary diagram showing the configuration of an electric vehicle 10 according to a second embodiment of the present disclosure.

Description in common between the electric vehicle 10 shown in FIG. 2 and the first embodiment described above with reference to FIG. 1 is omitted herein to avoid redundancy, and their difference(s) will be described below.

A difference between the electric vehicle 10 of the second embodiment and the electric vehicle 10 of the first embodiment is that the input pin IN1 and the input pin IN2 of the voltage comparator 320 are respectively connected to the first end and the second end of the resistor 140 instead of the first end and the second end of the main contactor 110. That is, the input pin IN1 is connected to the first end of the resistor 140, and the input pin IN2 is connected to the second end of the resistor 140. Accordingly, as opposed to the first embodiment, instead of the first test voltage, a voltage across the resistor 140 (hereinafter referred to as 'second test voltage') is compared with a third threshold voltage by the voltage comparator 320.

When the second test voltage is lower than the third threshold voltage, the voltage comparator 320 is configured to output a high-level signal from the output pin OUT1. On the contrary, when the second test voltage is equal to or higher than the third threshold voltage, the voltage comparator 320 is configured to output a low-level signal to the output pin OUT1. The third threshold voltage may be equal to the second threshold voltage of the first embodiment.

Figure 3:
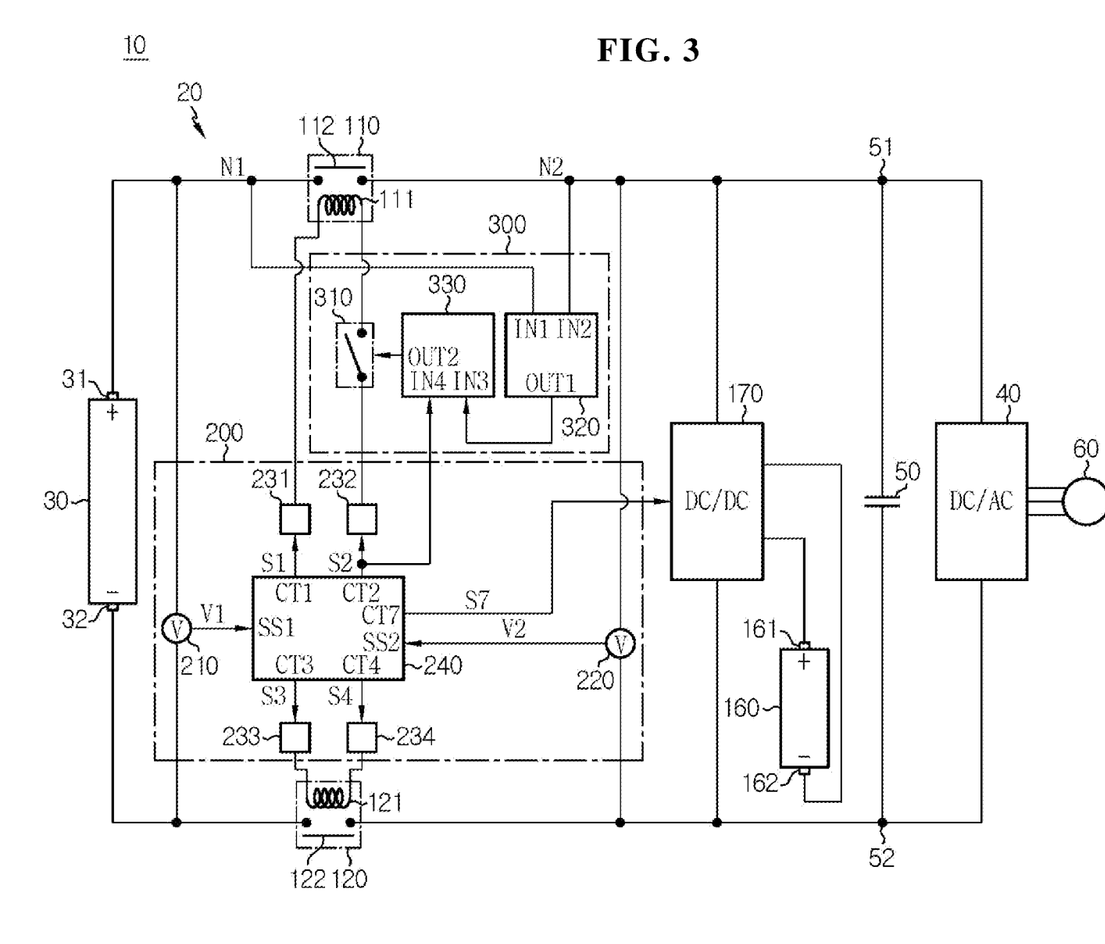
FIG. 3 is an exemplary diagram showing the configuration of an electric vehicle according to a third embodiment of the present disclosure.

FIG. 3 is an exemplary diagram showing the configuration of an electric vehicle 10 according to a third embodiment of the present disclosure.

Description in common between the electric vehicle 10 shown in FIG. 3 and the first embodiment described above with reference to FIG. 1 is omitted herein to avoid redundancy, and their difference(s) will be described below.

A difference between the electric vehicle 10 of the third embodiment and the electric vehicle 10 of the first embodiment is that (i) the pre-charge circuit 150, the high-side driver 235 and the low-side driver 236 are removed from the battery pack 20, (ii) a battery 160 and a converter 170 are added, (iii) the control pin CT5 and the control pin CT6 are removed from the control circuit 240, and (iv) a control pin CT7 is added to the control circuit 240.

Instead of the pre-charge circuit 150, the battery 160 and the converter 170 are provided to pre-charge the capacitor 50. A rated voltage of the battery 160 may be lower than a rated voltage of the battery 30.

The control circuit 240 is operably coupled to the converter 170 through the control pin CT7. Each of a pair of voltage input terminals provided in the converter 170 is respectively connected to two terminals 161, 162 of the battery 160 to receive the voltage across the battery 160. Each of a pair of voltage output terminals provided in the converter 170 is connected to the two terminals 51, 52 of the capacitor 50 respectively.

The converter 170 is configured to boost the voltage of the battery 160 and apply the boosted voltage between the two terminals of the capacitor 50 in response to a control signal S7 from the control pin CT7. The control signal S7 may be a high-level signal. The converter 170 stops boosting the voltage of the battery 160 in response to a low-level signal from the control pin CT7. While the control signal S7 is outputted by the control circuit 240, the capacitor 50 is pre-charged with the boosted voltage from the converter 170.

The control circuit 240 may control the main contactor 110, the main contactor 120 and the converter 170 as below.

First, the control circuit 240 outputs the control signal S3 and the control signal S4 to move the contact 122 to the closed operational position. Subsequently, when the capacitor voltage is lower than the first threshold voltage, the control circuit 240 outputs the control signal S7 from the control pin CT7 to pre-charge the capacitor 50. Subsequently, the control circuit 240 determines whether the pre-charging of the capacitor 50 is completed. When the capacitor voltage is equal to or higher than the first threshold voltage, the control circuit 240 determines that the pre-charging of the capacitor 50 is completed. When the capacitor voltage is lower than the first threshold voltage, the control circuit 240 determines that the pre-charging of the capacitor 50 is not yet completed. When it is determined that the pre-charging of the capacitor 50 is completed, the control circuit 240 outputs the control signal S1 and the control signal S2 to move the contact 112 to the closed operational position. Subsequently, the control circuit 240 stops outputting the control signal S7 to stop the operation of the converter 170.

Meanwhile, in the first embodiment, the second embodiment and the third embodiment described above, the main contactor 120 may be removed from the electric vehicle 10, and the terminal 32 of the battery 30 and the terminal 52 of the capacitor 50 may be connected to each other directly or through an electrical conductor (e.g., an electrical cable). In this case, the high-side driver 233, the low-side driver 234, the control pin CT3 and the control pin CT4 may be removed from the battery management system 200.

According to the above-described embodiments, it is possible to prevent damage to the main contactor 110 due to a flow of high current in the main contactor 110 by double-checking whether the pre-charging of the capacitor 50 is completed.

The embodiments of the present disclosure described hereinabove are not implemented only through the apparatus and method, and may be implemented through programs that perform functions corresponding to the configurations of the embodiments of the present disclosure or recording media having the programs recorded thereon, and such implementation may be easily achieved by those skilled in the art from the disclosure of the embodiments previously described.

While the present disclosure has been hereinabove described with regard to a limited number of embodiments and drawings, the present disclosure is not limited thereto and it is obvious to those skilled in the art that various modifications and changes may be made thereto within the technical aspects of the present disclosure and the equivalent scope of the appended claims.

Additionally, as many substitutions, modifications and changes may be made to the present disclosure described hereinabove by those skilled in the art without departing from the technical aspects of the present disclosure, the present disclosure is not limited by the above-described embodiments and the accompanying drawings, and some or all of the embodiments may be selectively combined to allow various modifications.

What is claimed is:

1. A battery management system comprising:
a first voltage sensor configured to detect a first voltage between a first terminal and a second terminal of a first battery;
a second voltage sensor configured to detect a second voltage between a first terminal and a second terminal of a capacitor provided on a side of an electrical load;
a high-side driver connected to a first end of a contactor coil included in a main contactor installed between the first terminal of the first battery and the first terminal of the capacitor;
a low-side driver connected to a second end of the contactor coil;
a malfunction prevention circuit including a safety switch installed between the first end of the contactor coil and the high-side driver or between the second end of the contactor coil and the low-side driver; and
a control circuit operably coupled to the high-side driver, the low-side driver, the first voltage sensor, the second voltage sensor and the malfunction prevention circuit,
wherein the control circuit is configured to:
determine a first threshold voltage based on the first voltage, and
output a first high-level signal when the second voltage is equal to or higher than the first threshold voltage,
wherein the malfunction prevention circuit is configured to output a second high-level signal to the safety switch in response to the first high-level signal when a third voltage between a first end and a second end of the main contactor is lower than a second threshold voltage, and
wherein the safety switch is turned on by the second high-level signal.

2. The battery management system according to claim 1, wherein the control circuit is configured to determine the first threshold voltage by multiplying the first voltage by a first scaling value, and
wherein the first scaling value is greater than 0 and smaller than 1.

3. The battery management system according to claim 1, wherein the control circuit is configured to determine the first threshold voltage by subtracting a predetermined reference voltage from the first voltage.

4. The battery management system according to claim 1, wherein the control circuit is configured to output a first low-level signal when the second voltage is lower than the first threshold voltage,
wherein the malfunction prevention circuit is configured to output a second low-level signal to the safety switch in response to the first low-level signal, and
wherein the safety switch is turned off by the second low-level signal.

5. The battery management system according to claim 4, wherein the malfunction prevention circuit further includes:
a voltage comparator having a first input pin connected to a first common node between the first terminal of the first battery and the first end of the main contactor, a second input pin connected to a second common node between the first terminal of the capacitor and the second end of the main contactor, and a first output pin; and
a verification circuit having a third input pin connected to the first output pin, a fourth input pin connected to the control circuit and a second output pin connected to the safety switch, wherein the voltage comparator is configured to output a third high-level signal from the first output pin when the third voltage applied between the first input pin and the second input pin is lower than the second threshold voltage, and wherein the verification circuit is configured to output the second high-level signal from the second output pin when the third high-level signal and the first high-level signal are input to the third input pin and the fourth input pin respectively.

6. The battery management system according to claim 5, wherein the voltage comparator is configured to output a third low-level signal from the first output pin when the third voltage is equal to or higher than the second threshold voltage, and the verification circuit is configured to output the second low-level signal from the second output pin when the third low-level signal is input to the third input pin or the first low-level signal is input to the fourth input pin.

7. A battery pack comprising the battery management system according to claim 1.

8. An electric vehicle comprising the battery pack according to claim 7.

9. The electric vehicle according to claim 8, further comprising:
a second battery; and
a converter configured to boost a voltage of the second battery and apply the boosted voltage between the first terminal and the second terminal of the capacitor in response to a third high-level signal from the control circuit,
wherein the control circuit is configured to output the third high-level signal to the converter when the second voltage is lower than the first threshold voltage.

10. A battery management system comprising:
a first voltage sensor configured to detect a first voltage between a first terminal and a second terminal of a first battery;
a second voltage sensor configured to detect a second voltage between a first terminal and a second terminal of a capacitor provided on a side of an electrical load;
a high-side driver connected to a first end of a contactor coil included in a main contactor installed between the first terminal of the first battery and the first terminal of the capacitor;
a low-side driver connected to a second end of the contactor coil;
a malfunction prevention circuit including a safety switch installed between the first end of the contactor coil and the high-side driver or between the second end of the contactor coil and the low-side driver; and
a control circuit operably coupled to the high-side driver, the low-side driver, the first voltage sensor, the second voltage sensor and the malfunction prevention circuit,
wherein the control circuit is configured to:
determine a first threshold voltage based on the first voltage, and
output a first high-level signal when the second voltage is equal to or higher than the first threshold voltage,
wherein the malfunction prevention circuit is configured to output a second high-level signal to the safety switch in response to the first high-level signal when a third voltage between a first end and a second of a resistor of a pre-charge circuit connected in parallel to the main contactor is lower than a second threshold voltage, and
wherein the safety switch is turned on by the second high-level signal.

11. The battery management system according to claim 10, wherein the malfunction prevention circuit further includes:
a voltage comparator having a first input pin connected to the first end of the resistor, a second input pin connected to the second end of the resistor, and a first output pin; and
a verification circuit having a third input pin connected to the first output pin, a fourth input pin connected to the control circuit and a second output pin connected to the safety switch,
wherein the voltage comparator is configured to output a third high-level signal from the first output pin when the third voltage applied between the first input pin and the second input pin is lower than the second threshold voltage, and
wherein the verification circuit is configured to output the second high-level signal from the second output pin when the third high-level signal and the first high-level signal are input to the third input pin and the fourth input pin respectively.

12. A battery pack comprising the battery management system according to claim 10.

13. An electric vehicle comprising the battery pack according to claim 12.

14. The electric vehicle according to claim 13, further comprising:
a second battery; and
a converter configured to boost a voltage of the second battery and apply the boosted voltage between the first terminal and the second terminal of the capacitor in response to a third high-level signal from the control circuit,
wherein the control circuit is configured to output the third high-level signal to the converter when the second voltage is lower than the first threshold voltage.

* * * * *